Figure 1:
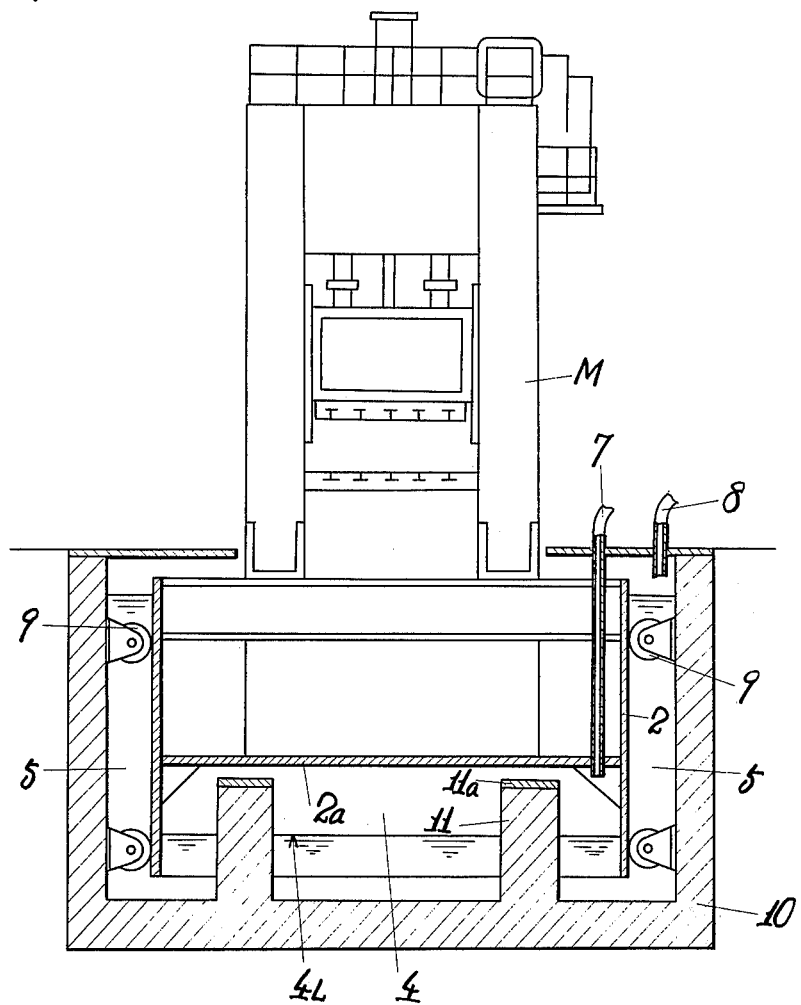

United States Patent [19]
Takasaki et al.

[11] 3,940,098
[45] Feb. 24, 1976

[54] VIBRATION-ISOLATED FOUNDATION WHICH UTILIZES BUOYANCY

[75] Inventors: Shuhei Takasaki, Osaka; Yasumoto Goto, Otsu, both of Japan

[73] Assignees: Osaka Prefectural Government, Osaka; Goto Drop Forging Co., Ltd., Kusatsu, both of Japan

[22] Filed: June 11, 1973

[21] Appl. No.: 368,585

[30] Foreign Application Priority Data
June 20, 1972  Japan.............................. 47-61725

[52] U.S. Cl. ............................................. 248/20
[51] Int. Cl.² ........................................ F16M 13/00
[58] Field of Search ............. 248/20, 350, 399, 400

[56] References Cited
UNITED STATES PATENTS

| | | | |
|---|---|---|---|
| 598,186 | 2/1898 | Thompson ...................... | 248/400 X |
| 2,605,066 | 7/1952 | Brown............................. | 248/20 |
| 2,664,257 | 12/1953 | McNally.......................... | 248/20 UX |
| 3,153,789 | 10/1964 | Ashton........................... | 248/179 UX |

FOREIGN PATENTS OR APPLICATIONS

| | | | |
|---|---|---|---|
| 1,494,326 | 7/1967 | France............................... | 248/400 |
| 247,727 | 11/1969 | U.S.S.R............................... | 248/20 |

*Primary Examiner*—William H. Schultz
*Attorney, Agent, or Firm*—Wenderoth, Lind & Ponack

[57] ABSTRACT

A vibration-isolating foundation for a machine which gives out vibration or impact during operation has an inertia block on which the machine is mounted and having an open space or cavity thereunder and the whole of both the machine and the block is floated in a water tank, whereby the whole or part of the weight of the machine and the block is supported by buoyancy of the block in the water due to the air in the cavity and thus transmission of a dynamic load to the floor surface supporting the foundation during the operation of the machine is reduced to a large degree.

4 Claims, 2 Drawing Figures

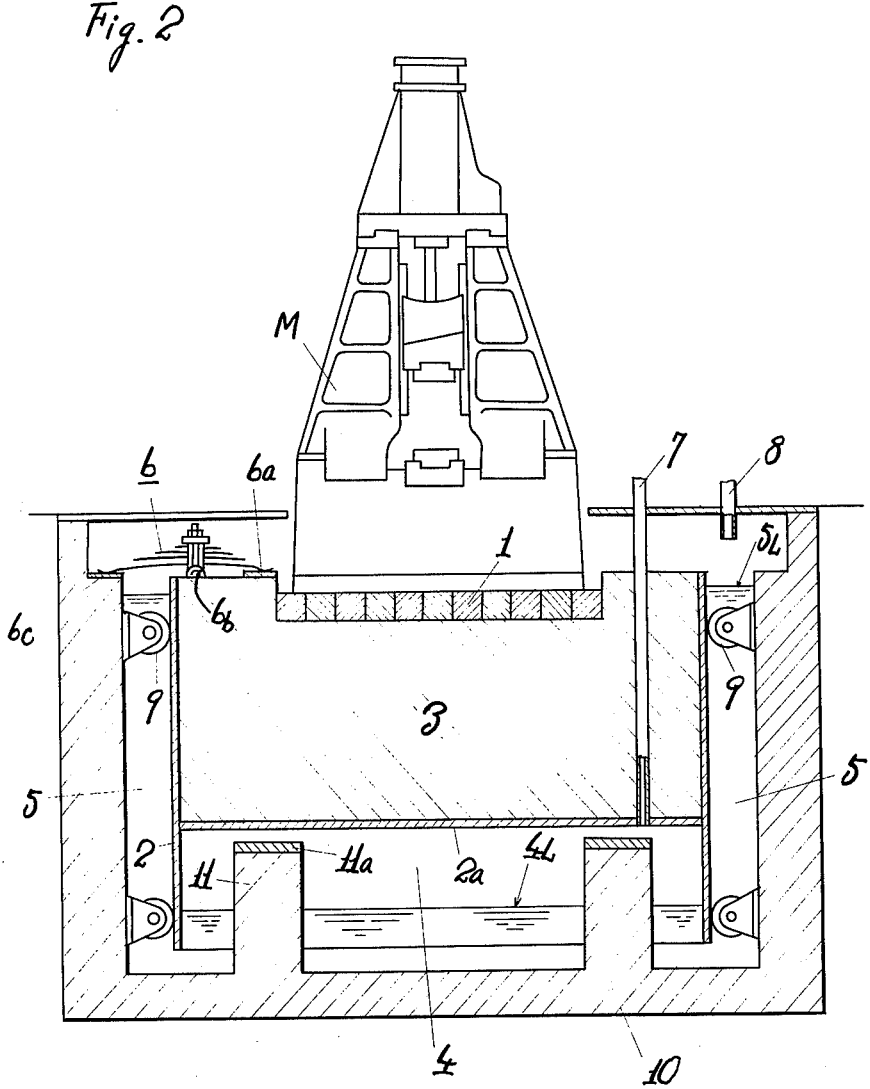

VIBRATION-ISOLATED FOUNDATION WHICH UTILIZES BUOYANCY

This invention relates to a vibration-isolating foundation to be used for machines which cause considerable vibration and impact forces during operation such as forging hammers, hydraulic presses, crank presses, friction presses, etc. For machines of these types it is the usual practice to mitigate the transmission of vibration or shock onto the floor surface on which the machines rest by interposing an elastic substance such as a spring or rubber between the machine and its foundation. This known method, however, does not produce sufficient vibration-isolating effect, especially in the case of large size machines, because it is difficult to set the natural frequencies of suspended machines at a low level.

In order to overcome the above-mentioned difficulty, the present invention utilizes the buoyancy of the water and elasticity of the air for supporting the machine, and more particularly, in the present invention the machine is mounted upon a foundation having an open space or cavity filled with air on the underside thereof and the whole of both the machine and the foundation is floated in a water tank provided on the ground.

Under the above arrangements, water pressure caused by the difference in water head between the inside and the outside of the cavity is applied to the underside of the foundation through the air in the cavity, with the result that the buoyancy corresponding to the displacement tonnage of the foundation itself supports the weight of the foundation. Since the spring constant of the supporting force is determined chiefly by elasticity of the air layer, its value can be made smaller by making the thickness of the air layer larger. Moreover, the very slight transmission of high frequency vibration and shock also contributes toward producing very good vibration-isolating effect.

The attached drawings show embodiments of the present invention, in which

FIG. 1 is a longitudinal cross section of the foundation according to the present invention as it is used to support a pressing machine and FIG. 2 is a similar longitudinal cross section of the same foundation as it is used to support a forging hammer.

In the drawings, M is a machine which produces impact forces or vibrations, such as a forging machine, a press, etc. The machine is supported by an inertia block 3 either directly or with timber 1 therebetween. This inertia block is a block made of concrete or other material and is covered with an outer plate 2 at its periphery. An air chamber 4 is provided at the bottom of this inertia block 3. This air chamber 4 may be a box-shaped chamber made separately and connected to the underside of the inertia block 3 or may be formed integrally with the inertia block 3, as indicated by embodiments in the drawings, by a bottom 2a and extended parts of the outer plate 2. The air chamber 4 may be made in a special shape depending upon the material thereof.

The afore-mentioned block 3 is floated in a water tank 10 and has applied thereto a floating force due to the buoyancy of water as a result of the difference in the head between the water level 5L in the water chamber 5 of tank 10 and the water level 4L in the air chamber 4. Additional force can be applied by spring means, here shown in the form of a laminated spring 6 provided on the block. The spring 6 extends over a support 6a on the inertia block and a support 6c on the water tank, and the intermediate portion of this spring is bolted at a suspending point 6b on the inertia block. This spring 6 not only supplements the lack of buoyancy but also serves to adjust the level of the block 3 and to damp the up and down motion of the block 3.

It is desirable to have the block 3 made vertical up and down motion with neither lateral movement nor rotatory movement. A means for accomplishing this is shown in FIG. 1 and FIG. 2. As shown in FIG. 1 and FIG. 2, a plurality of rolls 9 extend from the inner surface of the water tank into the tank and are in close rotatable contact with the outer plate 2 of the block 3, whereby the block is guided in its up and down movement and is prevented from swinging. Besides this method, a conventional method of guiding the up and down motion can be employed, for example, many wire ropes (not shown in the drawings) can be stretched horizontally between the block and the inner surface of the water tank and these ropes are kept strained at all times to guide the up and down motion of the block. Below the bottom 2a of the block 3, there are provided supporting tables 11 which have a vertical dimension greater than the depth of cavity as shown in the drawings. These tables are to support the block 3 when water is drained from the water tank so that when the machine is not in operation it will rest thereon. In this case, a cushion 11a made of wood, rubber or the like is fixed on the top of the table so that the bottom of the block is not subjected to impact or concentrated load.

The air chamber 4 has connected thereto an air pipe 7 which extends outside of the foundation, whereby the air is supplied to or extracted from the air chamber 4. A water pipe 8 opens into the water chamber 5 to supply water to the latter.

The foregoing embodiment uses water but fluid other than water may be useful for the present invention. Furthermore, a part of pond, river, canal, lake or sea may be utilized in place of a water tank as a water reservoir.

On the basis of the embodiment in FIG. 1, the foundation according to the present invention was used experimentally for a forging machine, with the result that only the slight transmission of machine vibration onto the area surrounding the installed forging machine was observed.

What is claimed is:

1. A vibration-isolating foundation for a machine which produces vibrations or impact forces during operation, comprising an inertia block on which the machine is adapted to be supported and having a cavity on the bottom thereof, and a tank containing a body of liquid having an upper surface open to the atmosphere in which the said block is floated with said cavity in the liquid, supporting tables on the bottom of said tank below the inertia block and having a vertical dimension greater than the depth of said cavity, whereby at least part of the weight of the machine and the block is supported by the bouyancy of water applied to the block through the air in the cavity and thus transmission of a dynamic load produced by the operation of the machine through the liquid is reduced to a large degree and the machine can rest thereon when the machine is not in use.

2. A vibration-isolating foundation as claimed in claim 1 further comprising a plurality of free-running rollers are fixed to the inner surface of the tank and rotatably contacting the side of the inertia block for guiding the up and down motion of the inertia block.

3. A vibration-isolating foundation as claimed in claim 1 further comprising a water pipe extending into the water tank between the side of the tank and the inertia block to supply water to the water tank.

4. A vibration-isolating foundation as claimed in claim 1 further comprising an air pipe extending through said inertia block into said air cavity to supply the air to the air cavity or to extract air therefrom.

* * * * *